(12) United States Patent
Chen et al.

(10) Patent No.: US 6,361,484 B1
(45) Date of Patent: *Mar. 26, 2002

(54) ELECTRICALLY CONDUCTIVE AND SEMI-CONDUCTIVE POLYMERS

(75) Inventors: Wen-Pin Chen, Birmingham, MI (US); Albert C. Chiang, Danbury, CT (US); John A. Roderick, Scituate, RI (US); Marcelino A. Martins; George B. Martins, both of Coventry, RI (US)

(73) Assignee: Mearthane Products Corporation, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/557,062

(22) Filed: Apr. 21, 2000

(Under 37 CFR 1.47)

Related U.S. Application Data

(60) Continuation of application No. 08/899,678, filed on Jul. 24, 1997, now Pat. No. 6,063,499, which is a continuation of application No. 08/210,896, filed on Mar. 18, 1994, now abandoned, which is a division of application No. 07/870,610, filed on Apr. 16, 1992, now abandoned.

(51) Int. Cl.$^7$ .............................................. F16C 13/00
(52) U.S. Cl. ...................................... 492/59; 428/425.8
(58) Field of Search ................. 492/59, 18; 428/425.8; 252/500; 524/142, 144, 413, 435; 264/331.19; 355/245; 430/110, 31

(56) References Cited

U.S. PATENT DOCUMENTS

| | | | |
|---|---|---|---|
| 3,171,819 A | 3/1965 | Powanda | 524/144 |
| 3,725,308 A | 4/1973 | Ostolski | 252/513 |
| 4,196,268 A | 4/1980 | Brown et al. | 524/144 |
| 4,231,901 A | 11/1980 | Berbeco | 252/511 |
| 4,257,699 A | 3/1981 | Lentz | |
| 4,393,179 A | 7/1983 | Hoppe et al. | |
| 4,395,497 A | 7/1983 | Naarman et al. | 524/404 |
| 4,397,974 A | 8/1983 | Goyert et al. | 524/143 |
| 4,568,485 A | 2/1986 | Jonas et al. | |
| 4,581,158 A | 4/1986 | Lin | 528/458 |
| 4,617,325 A | 10/1986 | Knobel et al. | 524/142 |
| 4,618,630 A | 10/1986 | Knobel et al. | |
| 4,622,361 A | 11/1986 | Gill et al. | 524/710 |
| 4,652,399 A | 3/1987 | Herweh | |
| 4,654,279 A | 3/1987 | Bauer et al. | 429/192 |
| 4,655,966 A | 4/1987 | Guillaumon et al. | 524/410 |
| 4,710,015 A | 12/1987 | Takeda et al. | |
| 4,747,966 A | 5/1988 | Maeno et al. | 528/458 |
| 4,762,899 A | 8/1988 | Shikinami | |
| 4,798,851 A | 1/1989 | Werner et al. | |
| 4,806,571 A | 2/1989 | Knobel et al. | |
| 4,886,626 A | 12/1989 | Cope et al. | 252/500 |
| 5,011,739 A | 4/1991 | Nielsen et al. | 428/425.8 |
| 5,064,574 A | 11/1991 | Oldham et al. | 524/404 |
| 5,077,330 A | 12/1991 | Erhart et al. | 528/57 |
| 5,110,669 A | 5/1992 | Knobel et al. | |
| 5,156,915 A | 10/1992 | Wilson et al. | |
| 5,212,032 A | 5/1993 | Wilson et al. | |
| 5,217,838 A | 6/1993 | Wilson et al. | |
| 5,238,969 A | 8/1993 | Guarneri et al. | 524/785 |
| 5,247,001 A | 9/1993 | Lacour | 528/56 |
| 5,248,560 A | 9/1993 | Baker et al. | |
| 5,250,357 A | 10/1993 | Wilson et al. | |
| 5,284,600 A | 2/1994 | Hilti et al. | |
| 5,348,762 A | 9/1994 | Hofherr et al. | |
| 5,354,641 A | 10/1994 | Lima-Marques | |
| 5,387,627 A | 2/1995 | Hofherr et al. | |
| 5,504,217 A | 4/1996 | Hilti et al. | |
| 5,830,541 A | 11/1998 | Carswell et al. | |
| 5,874,172 A | 2/1999 | Beach | 428/425.8 |

FOREIGN PATENT DOCUMENTS

| | | |
|---|---|---|
| DE | 28 45 674 | 5/1980 |
| EP | 0 122 633 | 10/1984 |
| EP | 0 521 826 | 1/1993 |
| JP | 49-97845 | 9/1974 |
| JP | 49-97846 | 9/1974 |
| JP | 49-97847 | 9/1974 |
| JP | 57-30319 | 6/1982 |
| JP | 60-189229 | 9/1985 |
| JP | 61-264053 | 11/1986 |
| JP | 62-256990 | 11/1987 |
| JP | 1-109663 | 4/1989 |
| JP | 2-166158 | 6/1990 |
| JP | 60-25159 | 4/1994 |
| JP | 63-48561 | 12/1994 |
| TW | 205038 | 5/1993 |

OTHER PUBLICATIONS

Brunner, "Leitklebstoffe: Die sinnvolle Alternative", Adhaesion, 1987, 31(10), pp. 9–10, 13–13 (Ger). English Abstract provided.

Chiang, "Synthesis and Electrical Conductivity Measurement of Polyphenylacetylene and Its Derivatives", 1980.

Jasiulek et al., "Stromleitende Klebstoffe–Verlaf der Elektrizitatsleitung", Adhaesion, 1980 24(4), pp. 94–99 (Ger), English abstract provided.

Yoneyan et al., Kogyo Zairyo, 1983, 31(11), pp. 101–106 (Japan) (A review of six references), English abstract provided.

Furukawa et al., "Mechanical Properties and Electrical Condutiving of Carbon Polyurethane Composites", (abstract) CA113(18):153610a (1990).

Killis et al., "Ionic Conductivity of Polyether–Polyurethane Networks Containing Alkali Metal Salts. An Analysis of the Concentration Effect", (Abstract) CA100(6):35112y (1984).

*Primary Examiner*—I Cuda-Rosenbaum
*Assistant Examiner*—Marc W Butler
(74) *Attorney, Agent, or Firm*—Fish & Richardson P.C.

(57) ABSTRACT

A roller includes a metal core, a cylinder including polyurethane, and a conductive adhesive between the metal core and the cylinder. The polyurethane includes a solid solution of a transition metal halide salt and includes less than 5% of salt by weight. The transition metal halide salt provides the polyurethane with a uniform conductivity and a uniform resistivity of between $10^{12}$ ohm-cm and $10^5$ ohms-cms.

7 Claims, No Drawings

ELECTRICALLY CONDUCTIVE AND SEMI-CONDUCTIVE POLYMERS

This application is a continuation of U.S. Ser. No. 08/899,678, filed Jul. 24, 1997, now U.S. Pat. No. 6,063,499 which is a continuation of U.S. Ser. No. 08/210,896, filed Mar. 18, 1994, now abandoned, which is a divisional of U.S. Ser. No. 07/870,610, filed Apr. 16, 1992 now abandoned.

FIELD OF THE INVENTION

This invention relates to the field of polymers, particularly urethane rubbers and foams, and to a method of making such polymers electrically conductive or electrically semi-conductive.

BACKGROUND OF THE INVENTION

In the prior art, polymers, particularly urethane rubber, have been used for a variety of applications in which it is desirable that the product have some electrical conductivity, either throughout the product itself or at least on the exposed surface of the product.

One example involves rollers used in many printers to help transport paper or carry toner in electrograhic printing. The rollers are often made of a polymer such as polyurethane or covered with a similar polymer to facilitate their paper-carrying or toner transfer ability. Different materials, including rubber, may be used in place of polymers for these applications, but because these polymers are much more durable than rubber, they are preferred. Most polymers do not conduct electricity, however, and static charges, which adversely effect the operation of the printer, can build up on the rollers. A similar problem exists if rollers of the same material are used for other purposes, such as carrying semiconductors as part of a semiconductor manufacturing process. Other end uses require conductive or semi-conductive parts as well.

As a result, there have been attempts make such polymer parts electrically conductive. In some cases, the part made from the polymer has been coated with an electrically conductive material. Unfortunately, these coatings have short life spans, and some are toxic. Another approach has been to disperse an electrically-conductive material in the polymer when the part is being fabricated. These electrically-conductive materials have included metal powders such as silver, copper, and nickel, and also materials such as carbon black, graphite, or other conductive polymers. However, the resulting products have several serious drawbacks. In the prior art, in order to make the polymer even semi-conductive, a large amount of conductive filler, e.g., metal powder like carbon black, had to be used, often as high as 10% to 40% of the overall mixture by weight. This degraded the mechanical and thermal properties of the resulting polymer part. Moreover, because of the size, and nature of the conductive particles, as well as the way in which the particles were mixed with the polymer, conductivity was not very great.

Another related problem is that it is very difficult, due to the relative size and weight of the added particles and the difficulty in dispersing them into the polymeric composition, to achieve a uniform distribution of the conductive material throughout the polymer. As a result of an uneven distribution, the electrical conductivity of the resulting product is not uniform, and the resulting product's mechanical and thermal properties suffer as well. As a result of all this, in general, products made from such compounds have been far less than satisfactory, and in fact, in some applications, become high maintenance items.

Finally, a related problem is that it is often desirable to select the specific conductivity of an polymer in advance, as different end applications preferentially require parts with different conductivities. Selection was not really possible with the prior art methods of making semi-conductive polymers.

Accordingly, one object of the invention is to provide a method by which polymeric materials may be made electrically conductive, without the need for conductive coatings or large amounts of conductive fillers.

Another object of the invention is to provide a method of making an electrically conductive polymeric material so that the resulting product has uniform electrical conductivity throughout.

Another object of the invention is to provide a method of making an electrically conductive polymeric material so that the relative electrical resistance of the resulting product may be varied with a high degree of accuracy.

Another object of the invention is to provide a method of making an electrically-conductive polymeric material whereby the mechanical and thermal properties of the resulting product are not degraded from what would be expected with a similar material which was non-conductive.

Another object of the invention is to provide a polymeric material which is electrically conductive and which may be molded and machined.

Another object of the invention is to provide an electrically-conductive polymeric material that is free of voids.

Another object of the invention is to provide an electrically-conductive polymeric material that when used on the surface of rollers, e.g., in a printer, inhibits build-up a static charge on the roller.

Another object of the invention is to provide a polymeric material with good thermal stability.

SUMMARY OF THE INVENTION

The invention features an electrically conductive or semi-conductive polymeric material that has a resistivity of between $10^{12}$ ohm-cm and $10^5$ ohm-cm. The material is a solid solution of metal salt dissolved in a polymer. The metal salt is complexed with the polymer, which is what provides the material with its conductive properties. Depending on the desired resistivity, the quantity of metal salt in the material can be varied, although preferably the material includes only a small amount (less than 1%, more preferably less than 0.1%) of the metal salt by weight. Because only a small amount of the metal salt is included in the material, the material has good mechanical and thermal properties. These properties, coupled with the conductive nature of the material, make the material suitable for use as coatings on, e.g., rollers used on paper printers.

The preferred polymers contain, e.g., nitrogen, oxygen, sulfur or halide atoms, or unsaturated (double and triple bond) groups, which are available for complexing with the metal salt. Preferred polymers include elastomeric polymers like polyurethanes and rubbers, adhesive polymers, and plastics. When rubbers are used, the material also preferably includes a plasticizer.

Preferred metal salts suitable for use in the material include transition metal halides like $CuCl_2$, $CuBr_2$, $CoCl_2$, $ZnCl_2$, $NiCl_2$, $FeCl_2$, $FeBr_2$, $FeBr_3$, $CuI_2$, $FeCl_3$, $FeI_3$, and $FeI_2$. Other preferred salts include $Cu(NO_3)_2$, copper lactate, copper tartrate, iron phosphate, iron oxalate, $LiBF_4$, and $H_4Fe(CN)_6$.

The invention also features a method of preparing these polymeric materials. Generally, the method includes making a homogenous solution of the metal salt in a polymer or polymer precursor, and curing the composition. When the polymer precursor is an isocyanate functional prepolymer, the solution also includes an extender (polyol or polyamine) that reacts with the isocyanate groups during curing to form a polyurethane resin. This method results in an even distribution of the metal salt throughout the polymeric material, which provides the material with uniform conductivity throughout.

The conductive elastomers are suitable for use in a variety of industrial applications to control surface charge and to provide good heat conductivity and expanded life. For example, the polymers can be used to coat the belts, shafts, wheels, inserters, and paper handling and copier toner pick-up rollers in paper printers. The polymer can be used to coat car bodies, print circuits, seals, and to dissipate charges in various other electrical applications, such as coating on belts that are used to transport semiconductor wafers during manufacture. The conductive plastic materials (such as nylon) can be used to coat disc drives, machine body parts, cabinets, and carry cases.

Other features and advantages of the invention will be apparent from the description of the preferred embodiment thereof, and from the claims.

DESCRIPTION OF THE PREFERRED EMBODIMENT

The preferred polymers are polyurethanes. The preferred method of preparing conductive polymeric materials including a polyurethane is to mix an extender (polyol or amine) or an isocyanate-functional prepolymer with a solution of a metal salt. The mixture is then cured. Of course, other standard ingredients, like a cure accelerator or a flame retardant, may be included in the mixture.

EXAMPLE 1
Conductive Laser Roller

A steel core was coated with an adhesive (Thixon AP 3437 from Morton International, West Alexandria, Ohio). The part was then completely dried.

A 5% solution of copper chloride was prepared as follows. In a one liter container, 475 grams of Fyrol PCF (tri(B-chloropropyl) phosphate, available from Akzo Chemical Inc., Chicago, Ill.), 475 grams of Fyrol CEF (tri(B-chlorethyl) phosphate, available from Akzo Chemical Inc., Chicago, Ill.), 50 grams of dried copper chloride (available from Aldrich Chemical Company, Milwaukee, Wis.), and 6 grams of Pluracol TP-440 (polyol available from BASF Corporation, Parsippany, N.J.) were mixed under mechanical stirring at 200–500 rpm and at 220 F. for 2 hours. A green solution was obtained.

A 55 gallon resin tank (made by Amplan Inc., Middlesex, N.J., equipped with vacuum, stirring, pressure, venting valves and temperature control) was filled with a polyisocyanate functional prepolymer, Vibrathane 8011 (available from Uniroyal Chemicals, Middlebury, Conn.) and the temperature raised to, and maintained at, 170° F. In a 15 liter container, 8200 grams of Isonol 93 (available from the Upjohn Co., Kalamozoo, Mich.), 1400 grams of TIPA (tributoxyethyl phosphate, available from FMC Corp. of Nitro, W.Va.), 160 grams of copper chloride solution (5%) and 48 grams of Metacure T-12 (dibutylton dilaurate, available from Air Products, Allentown, Pa.) were mixed with mechanical stirring at 200–500 rpm for 5 minutes at room temperature. The TIPA increases the solubility of the ingredients; the T-12 is a catalyst. The mixture was then degassed for 30 minutes under vacuum. The mixture was transferred to the 5 gallon curative tank (made by Amplan Inc. and equipped with a mechanical mixer).

Both the prepolymer and the curative were mixed through an Automatic Process Control dispenser to produce a uniform mixing. By adjusting the flow rate for each tank, 148600 grams of the prepolymer (Vibrathane 8011) and 9800 grams of the curative were mixed thoroughly.

The mixture was charged to each casting mold surrounding the steel cores. The mixture then was cured in the casting mold at 260° F. for 20 minutes. It was then demolded and left in the oven at 230° F. for 12 hours.

The cased roller was then ground to obtain the specified dimensions. The finished part has hardness of 53 Shore A and had electrical resistivity of $3 \times 10^9$ ohms-cm.

EXAMPLE 2
Conductive Laser Roller

A second conductive laser roller was made by an analagous procedure as in Example 1, except that the formulation was changed to the following:

| Components | Weight (grams) |
| --- | --- |
| 8011 | 148600 |
| I-93 | 8200 |
| TIPA | 1400 |
| Copper Chloride | 800 |
| T-12 | 6 |

The finished part had a hardness of 53 Shore A and a resistivity of $1.5 \times 10^9$ ohms-cm.

EXAMPLE 3
Non-Foam Polyurethane Formulation and the Effect of Varying the Quantity of Metal Salt A 0.5% solution of copper chloride (10 g) is added to 190 g of Metacure T-12 and mixed until the copper chloride dissolved. The resulting copper chloride solution (165 g) was mixed with 8200 grams of polyol-234-630 (polyglycol, available from BASF, N.J.), and this solution is mixed with 1300 grams of trisopropanolamine 99 (available from Dow Chemical USA, Mo.) at room temperature. This solution (30.4 g) is then vigorously mixed with 455 g of Vibrathane 8011 at 90–110° F. The mixture was then poured into multiple cavity molds and cured at 220–250° F. for 30 minutes. It was demolded and post-cured in an oven at 220° F. for 12 hours. The urethane rubber had a resultant of $3.5 \times 10^9$ ohms-cm.

The amount of copper chloride in the material was 0.03%. Further materials were made in which the quantity of copper chloride was increased while the remaining materials remained the same. The resistivity dropped (more conductivity) as the level of copper chloride increased, as follows:

| Amount (grams of $CuCl_2$ per 100 g of polyol) | Resistivity (ohms-cm) |
| --- | --- |
| $5.0 \times 10^{-6}$ | $4.0 \times 10^{10}$ |
| $5.0 \times 10^{-5}$ | $3.5 \times 10^9$ |
| $7 \times 10^{-5}$ | $3.0 \times 10^9$ |
| $9.4 \times 10^{-5}$ | $2.1 \times 10^9$ |
| $1.5 \times 10^{-4}$ | $1.7 \times 10^9$ |

-continued

| Amount (grams of CuCl$_2$ per 100 g of polyol | Resistivity (ohms-cm) |
|---|---|
| $2.0 \times 10^{-4}$ | $1.2 \times 10^9$ |
| $3.0 \times 10^{-4}$ | $9.0 \times 10^8$ |
| $5.0 \times 10^{-4}$ | $7.0 \times 10^8$ |
| $9.0 \times 10^{-3}$ | $2.0 \times 10^8$ |
| $1.4 \times 10^{-2}$ | $7.6 \times 10^7$ |
| $1.9 \times 10^{-2}$ | $1.8 \times 10^7$ |
| 2.5 | $4.4 \times 10^6$ |
| 5.0 | $5.0 \times 10^5$ |

EXAMPLE 4
Other Non-Foam Polyurethane Formulations

A metal salt solution (25%) was formulated with 15 grams of the metal salt; 20 grams of a flame retardant, tri-(B-chloropropyl)phosphate; 20 grams of Isonol 93; and 5 grams of tributoxyethyl phosphate. The metal salts that were used in the solution included zinc chloride, cobalt chloride, iron oxalate, lithium chloride, copper bromide chromium chloride, and copper chloride, all of which were purchased from Aldrich Chemical Co. of Milwaukee, Wisconsin. The salts were ground and dried prior to use. The solutions were prepared by mechanically mixing at 200–500 rpm at 150° F. for 1–3 hours.

The 25% metal salt solution (50 grams) was combined with a 38 grams of an extender MOCA (4,4'-diamino-3,3'-dichlorodiphenylmethane, available from Palmer Davis Seikra, Inc., N.Y.), and a polyurethane prepolymer, Vibrathane B-601 (a polyester/TDI prepolymer, available from Uniroyal Chemical). This was done by adding first the MOCA and then the prepolymer to the metal solution, with mixing, at 180–220° F. Vigorous mixing continued for 2–5 minutes.

The mixtures were then poured into a multiplecavity metal mold, and the prepolymer was cured at 220–250° F. for 30 minutes. The material was removed from the mold and post-cured in an oven for 12 to 20 hours at 200° F., after which curing was completed by letting the material sit at room temperature for at least 3 days to complete curing.

The polymeric materials that were obtained had the following resistivities:

| Salt | Resistivity (ohms-cm) |
|---|---|
| zinc chloride | $2.5 \times 10^{10}$ |
| cobalt chloride | $1.2 \times 10^{10}$ |
| iron chloride | $1.0 \times 10^6$ |
| iron oxalate | $1.3 \times 10^{10}$ |
| lithium chloride | $1.6 \times 10^{10}$ |
| copper bromide | $1 \times 10^6$ |
| chromium chloride | $1.9 \times 10^{10}$ |
| copper chloride | $5.0 \times 10^6$ |

EXAMPLE 5

Polyurethane Foams

The following conductive foams were prepared according to the same general procedure used above. The numbers in the table are the grams of the particular ingredient included in the example. The metal salt solutions were prepared as described previously; a foam agent such as methylene chloride, H$_2$O was used. The notes at the end of the table supply further information concerning the ingredients.

| | Example # | | | | | | | |
|---|---|---|---|---|---|---|---|---|
| Ingredients | 1 | 2 | 3 | 4 | 5 | 6 | 7 | 8 |
| P-380[1] | 450 | 325 | 143 | 155 | 180 | 180 | 180 | 400 |
| DC 200[2] | 1.8 | 1.8 | 6.6 | 10 | 7 | 6.6 | 7 | 7 |
| Black #4800[3] | 6 | 6 | 2.33 | 3.5 | 5 | 2.33 | 5 | — |
| Methylene chloride | 6 | 16 | 4.33 | 65 | 4.33 | 4.33 | 4.33 | 4.33 |
| Water | 3.5 | 3.5 | 1.3 | 2.25 | 1 | 1 | 1 | 0.5 |
| DABCO[4] | 3.5 | 3.5 | 1.1 | 0.5 | 0.5 | 1.16 | 1 drop | 1 drop |
| B-9-88[5] | 1 | 1 | 0.33 | 0.5 | 0.33 | 0.33 | 0.33 | 20 |
| T-12[6] | 0.1 | 0.1 | — | — | — | — | — | — |
| Mondure PF[7] (22.6%) | 120 | 120 | 56.7 | 70 | 50 | 50 | 50 | 53 |
| Metal Salt | — | 0.5 | 33.3 | 25 | 40 | 40 | 40 | 66 |
| Formula | CuCl$_2$ | CuCl$_2$ | FeCl$_2$ | FeCl$_2$ | CuCl$_2$ | FeCl$_2$ | CuCl$_2$ | CuCl$_2$ |
| Solution | 25% | 25% | 25% | 25% | 15% | 20% | 20% | 2% |
| Shore A | 15Å | 20Å | 20Å | 20Å | 15Å | 20Å | 10Å | 30Å |
| Resistivity (OHMS - cm) | $5 \times 10^{10}$ | $3 \times 10^9$ | $1.2 \times 10^8$ | $9 \times 10^7$ | $5 \times 10^7$ | $3.8 \times 10^7$ | $3 \times 10^7$ | $8 \times 10^6$ |

NOTES
[1]P-380 (Pluracol polyol 380) is a polyether polyol available from BASF Corporation of Wyandotte, Missouri.
[2]A silicone Surfactant available from Dow Corning.
[3]Black #4800 is a black pigment from Pigment Dispersions, Inc.
[4]DABCO is a triethylenediamine catalyst available from Air Products, Inc.
[5]B-9-88 (Benzoflex 9-88) is a benzoate ester plasticizer available from Harcros Chemicals Inc.
[6]T-12 is Hetacure T-12 catalyst.
A further example of a conductive polyurethane foam included 60 g of 20% copper chloride solution, prepared as previously described; 3.5 g of trimethylolpropane, (available from Celanese Chemical Company of Dallas, Texas); 7 g of DC 200; 0.5 g of water; 4.3 g of methylene chloride; 20 g of the B-9-88; and 400 g of Vibrathane 8011. The material was prepared by following the same general procedures previously described.
The foam had a resistivity of $8 \times 10^6$ ohm/cm.

EXAMPLE 6

Semiconductive Rubber

Conductive rubber materials are prepared as follows.

Iron Chloride (15 g, purchased from Johnson Mathley Electronics of Ward Hill, Mass.) are added to 85 g of the plasticizer dibutyl phthalate. The mixture is heated to 200° C. and mechanically stirred for 4 hours. A dark solution is obtained.

This solution is mixed with rubber materials (such as natural rubber, nitrile rubber, EPDM, styrene butadiene rubber, neoprene rubber, polysulfide rubber), and polyacrylate rubber, sulfer, and additives for rubber compounding. The rubber was then compression molded at 300 psi and 300° F. for 20 minutes to cure the rubber.

EXAMPLE 7

Adhesive

A copper chloride solution is mixed with a curative and adhesive, such as Thixon 405 (available from Morton International), Chemlok 205, 213, and 214 (available from Lord Corp.), and Conap 1146 (available from Conap Corp). These adhesives were mixed with copper chloride solutions to provide rubber materials with resistivities of between $1 \times 10^7$ ohms-cm and $1 \times 10^{12}$ ohms-cm. It is then coated on metal surfaces, dried and casted with urethane rubber.

EXAMPLE 8

Hot Melt

Plastic materials are melted and mixed with metal salts under heat. The molten polymer was poured with into mold to form conductive parts, "cure", as used herein, is meant to include this procedure, as well as procedures in which the prepolymer actually cross-links and chemically reacts to form further bonds. The plastic material used should contain electrons donor groups or atoms such as oxygen, nitrogen, sulfur, halides, or unsaturated bonds. The plastic material can be, for example, a polycarbonate, polyimide, polyamide, polysulfer, or fluorocarbon.

Other embodiments are within the following claims.

What is claimed is:

1. A roller comprising a metal core, a cylinder comprising a polyurethane including a solid solution of a transition metal halide salt, the polyurethane comprising less than 5% of the transition metal halide salt by weight, wherein the transition metal halide salt is complexed with said polyurethane to provide the polyurethane with a uniform conductivity and a uniform resistivity of between about $10^{12}$ ohms-cm and $10^5$ ohm cm, and a conductive adhesive between the metal core and the cylinder.

2. The roller of claim 1, wherein the cylinder does not include an additional conductive coating.

3. The roller of claim 1, wherein the transition metal halide salt is selected from the group consisting of $CuCl_2$, $CuBr_2$, $FeCl_3$, and $FeBr_3$.

4. The roller of claim 1, wherein the roller further includes a metal core surrounded by said cylinder.

5. The roller of claim 1, wherein the roller is a toner pick-up roller for a laser printer.

6. The roller of claim 1, wherein the polyurethane comprises less than 1% of the transition metal halide salt by weight.

7. A laser printer including the roller of claim 1.

* * * * *

UNITED STATES PATENT AND TRADEMARK OFFICE
CERTIFICATE OF CORRECTION

| | | |
|---|---|---|
| PATENT NO. | : 6,361,484 B1 | Page 1 of 1 |
| DATED | : March 26, 2002 | |
| INVENTOR(S) | : George B. Martins, John A. Roderick, Albert C. Chiang, PH.D., Marcelino A. Martins and Wen-Pin Chen | |

It is certified that error appears in the above-identified patent and that said Letters Patent is hereby corrected as shown below:

<u>Title page,</u>
Item [60], Related U.S. Application Data, delete "which is a continuation of application No. 08/210,896, filed Mar. 18, 1994, now abandoned,".

Signed and Sealed this

Tenth Day of December, 2002

JAMES E. ROGAN
*Director of the United States Patent and Trademark Office*